(12) United States Patent
Marsh et al.

(10) Patent No.: US 11,624,916 B2
(45) Date of Patent: Apr. 11, 2023

(54) APPARATUS AND METHOD FOR PIXELATED OCCLUSION

(71) Applicant: Innovega Inc., Bellevue, WA (US)

(72) Inventors: Jay Marsh, Bellevue, WA (US); Jerome Legerton, Bellevue, WA (US)

(73) Assignee: INNOVEGA INC., Bellevue, WA (US)

( * ) Notice: Subject to any disclaimer, the term of this patent is extended or adjusted under 35 U.S.C. 154(b) by 239 days.

(21) Appl. No.: 16/830,852

(22) Filed: Mar. 26, 2020

(65) Prior Publication Data

US 2021/0302734 A1 Sep. 30, 2021

(51) Int. Cl.
*G02B 27/01* (2006.01)
*G02F 1/1335* (2006.01)

(52) U.S. Cl.
CPC ... *G02B 27/0172* (2013.01); *G02F 1/133536* (2013.01); *G02B 2027/014* (2013.01); *G02B 2027/0174* (2013.01); *G02B 2027/0178* (2013.01); *G02F 1/133545* (2021.01); *G02F 1/133548* (2021.01)

(58) Field of Classification Search
CPC ...... G02B 2027/014; G02B 2027/0174; G02B 2027/0178; G02B 27/0172; G02B 27/283; G02B 5/3058; G02F 1/133536; G02F 1/133545; G02F 1/133548
See application file for complete search history.

(56) References Cited

U.S. PATENT DOCUMENTS

| 5,886,799 | A | 3/1999 | Molteni et al. |
| 2002/0191297 | A1 | 12/2002 | Gleckman et al. |
| 2006/0109398 | A1 | 5/2006 | Mi |
| 2006/0119937 | A1 | 6/2006 | Perkins et al. |
| 2010/0149618 | A1* | 6/2010 | Sprague ............... G09G 3/001 359/259 |
| 2010/0265163 | A1* | 10/2010 | Legerton ............ G02B 27/0172 345/7 |
| 2012/0120365 | A1* | 5/2012 | Legerton .......... B29D 11/00644 977/773 |
| 2015/0212327 | A1* | 7/2015 | Osterhout .......... G02B 27/0176 359/630 |
| 2015/0228089 | A1 | 8/2015 | Perdices-Gonzalez et al. |

(Continued)

OTHER PUBLICATIONS

Patent Cooperation Treaty, International Searching Authority, Search Report and Written Opinion for PCT/US2021/024471, 12 pages (dated Jun. 23, 2021).

*Primary Examiner* — Dmitriy Bolotin
(74) *Attorney, Agent, or Firm* — Viksnins Harris Padys Malen LLP

(57) ABSTRACT

An apparatus and method for providing pixelated occlusion is disclosed. The apparatus includes a display, a unitary and transmissive optical component, and a contact lens. The display provides a display image. The unitary reflective and transmissive optical component receives the display image and forms a reflected display image having a first polarization and receives a scene image and forms a transmitted scene image. The contact lens forms a combined image including the reflected display image and the transmitted scene image. The pixelated display includes one or more occluding pixels having a second polarization with the first polarization substantially orthogonal to the second polarization. The pixelated display is included anterior to the unitary and reflective optical component.

3 Claims, 8 Drawing Sheets

(56) References Cited

U.S. PATENT DOCUMENTS

| | | | |
|---|---|---|---|
| 2016/0131910 A1* | 5/2016 | Sprague | G02C 7/12 |
| | | | 359/630 |
| 2017/0059884 A1* | 3/2017 | Flitsch | G02F 1/133788 |
| 2017/0219825 A1* | 8/2017 | Benoit | G02C 11/10 |
| 2017/0227773 A1* | 8/2017 | Aksit | G02B 30/52 |
| 2018/0284470 A1* | 10/2018 | Yamamoto | G02B 30/56 |
| 2019/0004325 A1 | 1/2019 | Connor | |
| 2019/0179154 A1 | 6/2019 | Sprague | |
| 2020/0333596 A1 | 10/2020 | Yoon et al. | |

* cited by examiner

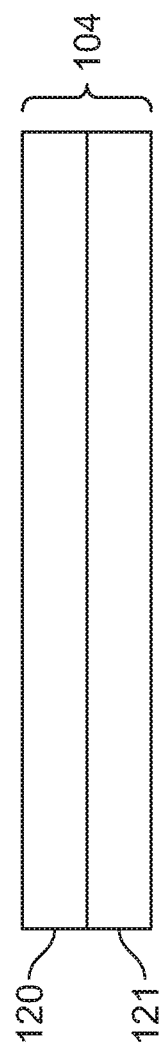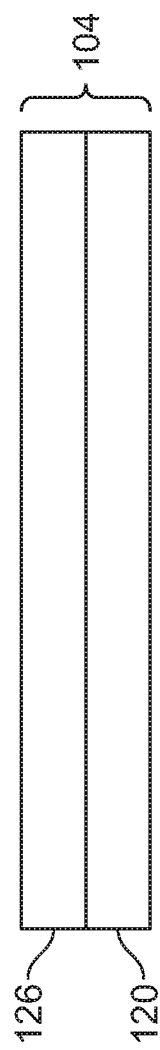

APPARATUS AND METHOD FOR PIXELATED OCCLUSION

BACKGROUND

Images containing information are combined with real world images in optical systems to provide a single combined image for viewing or display. Unintended defects and distortions can occur in the single combined image. For these are other reasons there is a need for the subject matter of the present disclosure.

SUMMARY

Consistent with the disclosed embodiments, an apparatus is disclosed. The apparatus comprises a display and a unitary reflective and transmissive optical component. The display provides a display image. The unitary reflective and transmissive optical component to receive the display image and to form a reflected display image having a first polarization. The unitary reflective and transmissive optical component to receive a scene image and form a transmitted scene image having a second polarization. The first polarization is substantially orthogonal to the second polarization. And the contact lens to form a combined image including the reflected display image and the transmitted scene image. In some embodiments, the unitary reflective and transmissive optical component includes a wire grid polarizer. In some embodiments, the unitary reflective and transmissive optical component includes a multi-layer interference stack reflective polarizer. In some embodiments, the unitary reflective and transmissive optical component includes a holographic reflective polarizer. In some embodiments, the unitary reflective and transmissive optical component includes a liquid crystal display joined to the wire grid polarizer.

Consistent with the disclosed embodiments an apparatus is disclosed. The apparatus comprises a substrate, a plurality of substantially parallel conductive and reflective lines, and a pixelated display substrate. The substrate has a first substrate surface and a second substrate surface. The plurality of substantially parallel conductive and reflective lines is formed on the first substrate surface. The pixelated display substrate includes a pixelated display. The pixelated display includes a plurality of pixels having a transparent state and an occluded state. Each of the plurality of pixels in the transparent state to transmit substantially all received light in a first polarization direction substantially orthogonal to the plurality of substantially parallel conductive and reflective lines. Each of the plurality of pixels in the occluded state to transmit light having a second polarization substantially parallel to the plurality of substantially parallel conductive and reflective lines. The pixelated display substrate has a pixelated display surface joined to the second substrate surface. In some embodiments, the substrate includes a spectral filter. In some embodiments, each of the plurality of substantially parallel conductive and reflective lines has a width of about 75 nanometers, a spacing of about 75 nanometers, and a height of about 150 nanometers. In some embodiments, each of the plurality of substantially parallel conductive and reflective lines includes aluminum. In some embodiments, the display includes a plurality of display pixels, each of the plurality of display pixels having a display pixel diameter, and each of the one or more occluded pixels having an occluded pixel diameter greater or substantially equal to the display pixel diameter.

Consistent with the disclosed embodiments a method is disclosed. The method includes forming a display image, processing the display image to form a reflected display image having a first polarization, processing a scene image to form a transmitted and occluded scene image having a second polarization substantially orthogonal to the first polarization, and processing the reflected display image and the transmitted and occluded scene image to form a combined image including the reflected display image and the transmitted and occluded scene image. In some embodiments, processing the scene image to form the transmitted and occluded scene image including the second polarization substantially orthogonal to the first polarization includes activating one or more pixels in a pixelated display. In some embodiments, the reflected display image and the transmitted and occluded scene image to form the combined image including the reflected display image and the transmitted and occluded scene image includes optically processing the reflected display image and the transmitted and occluded scene image with a contact lens including a first filter to pass the first polarization and a second filter to pass the second polarization.

Consistent with the disclosed embodiments, an apparatus is disclosed. The apparatus comprises an eyewear frame and a spectacle lens in the eyewear frame. The spectacle lens has a scene image optical axis when worn by a user that is aligned with a user's visual axis. A scene image is to be received substantially along the scene image optical axis. The apparatus comprises an emissive display coupled to the eyewear frame. The emissive display has a display optical axis to intersect the visual optical axis. The emissive display to form an emissive display image. The apparatus comprises a unitary reflective and transmissive optical component coupled to the eyewear frame. The unitary reflective and transmissive optical component has a complementary transmitted optical axis and a complementary reflected optical axis. The complementary transmitted optical axis is substantially aligned with the visual optical axis and the complementary reflected optical axis is substantially aligned with the display optical axis. The unitary reflective and transmissive optical component to reflect and polarize the emissive display image along the visual optical axis, and the unitary reflective and transmissive optical component to transmit and polarize the scene image along the visual optical axis. In some embodiments, the emissive display is located between about five millimeters and about twenty millimeters from the unitary reflective and transmissive optical component. In some embodiments, the emissive display is coupled to the eyewear frame by fitting into a cavity of a structure coupled to the eyewear frame. In some embodiments, the display optical axis is tilted away from a user's eye to form an angle of between about seventy-five and about eighty-five degrees with respect to the visual optical axis. In some embodiments, the emissive display to emit a unique color having a unique wavelength, and the unitary reflective and transmissive optical component to include a spectral filter including an absorptive notch filter having a center wavelength substantially equal to the unique wavelength. In some embodiments, the absorptive notch filter has a width of between about five and about thirty nanometers. In some embodiments, the center wavelength is within about five and about twenty nanometers of the unique wavelength.

BRIEF DESCRIPTION OF THE DRAWINGS

FIG. 1C shows an illustration of the unitary reflective and transmissive optical component including a wire grid polarizer in accordance with some embodiments of the present disclosure;

FIG. 1D shows an illustration of the unitary reflective and transmissive optical component including a liquid crystal display joined to the wire grid polarizer in accordance with some embodiments of the present disclosure;

DESCRIPTION

Reference will now be made in detail to the exemplary embodiments of the present disclosure described below and illustrated in the accompanying drawings. Wherever possible, the same reference numbers will be used throughout to refer to same or like parts.

While the present invention is described herein with reference to illustrative embodiments for particular applications, it should be understood that the invention is not limited thereto. Those having ordinary skill in the art and access to the teachings provided herein will recognize additional modifications, applications, embodiments, and substitution of equivalents, that all fall within the scope of the disclosure. Accordingly, the disclosure is not to be considered as limited by the foregoing or following descriptions.

Figure 1A:
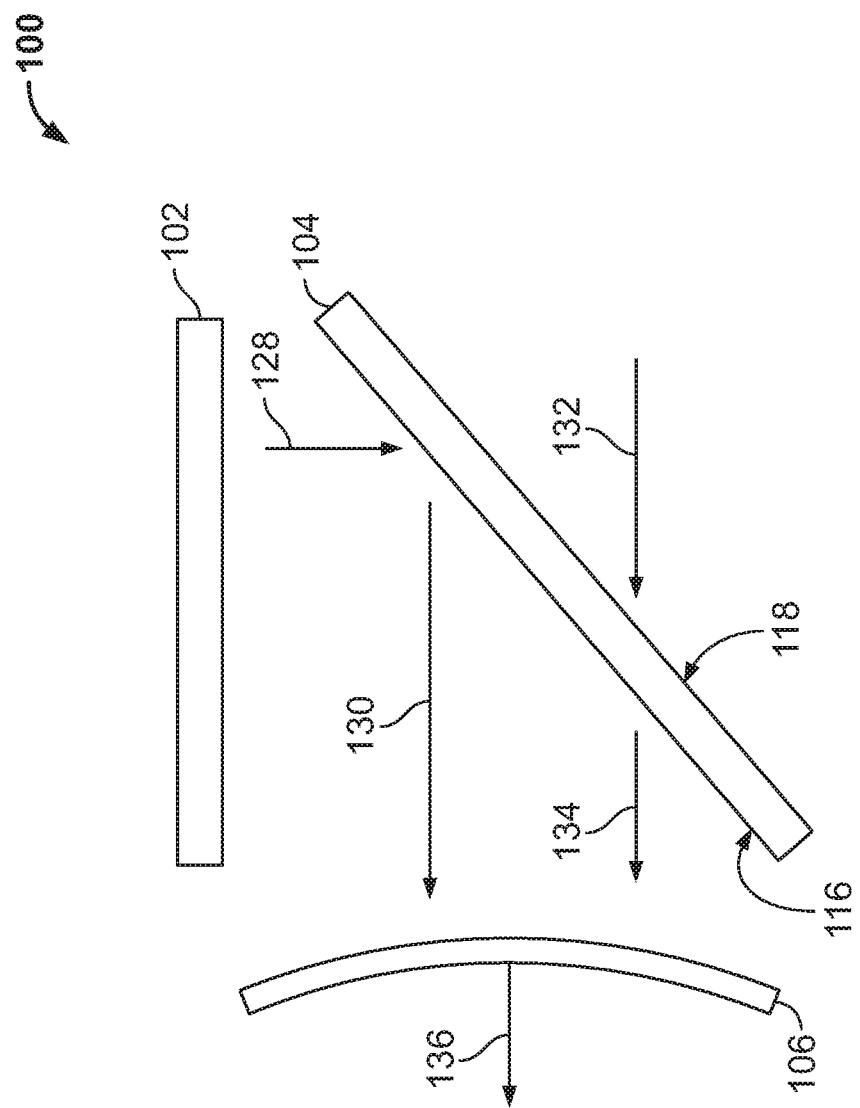
FIG. 1A shows an illustration of an apparatus including a display, a unitary reflective and transmissive optical component, and a contact lens in accordance with some embodiments of the present disclosure.

FIG. 1A shows an illustration of an apparatus 100 including a display 102, a unitary reflective and transmissive optical component 104, and a contact lens 106 in accordance with some embodiments of the present disclosure. The display 102 is not limited to a particular type of display. In some embodiments, the display 102 is an organic light-emitting diode display. An organic light-emitting diode display includes one or more emissive organic layers deposited on a substrate and located between an anode and a cathode.

Figure 1B:
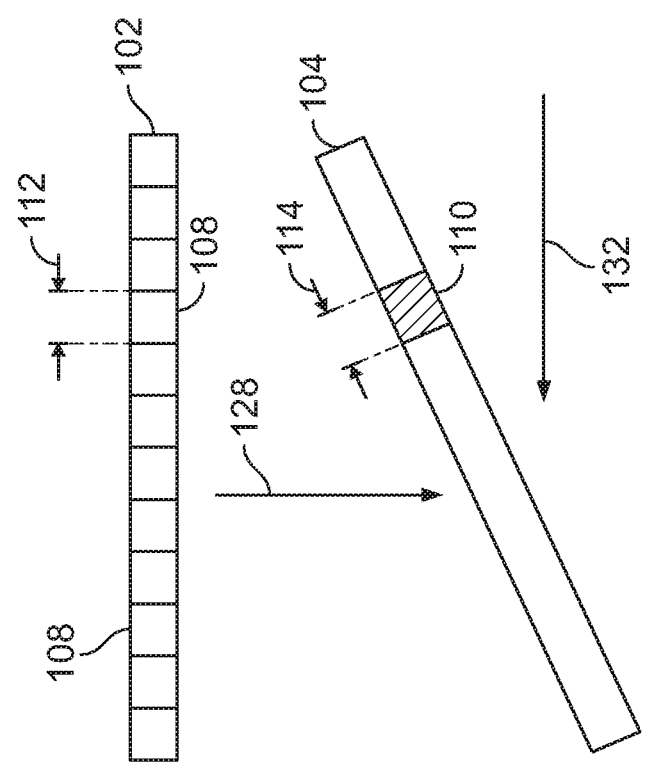
FIG. 1B shows an illustration of the display including a plurality of display pixels in accordance with some embodiments of the present disclosure.

FIG. 1B shows an illustration of the display 102 in accordance with some embodiments of the present disclosure. In some embodiments, the display 102 includes a plurality of display pixels 108 and the unitary reflective and transmissive optical component 104 includes one or more occluded pixels 110. Each of the plurality of display pixels 108 has a display pixel diameter 112. Each of the one or more occluded pixels 110 has an occluded pixel diameter 114 greater than or substantially equal to the display pixel diameter 112. In operation, the unitary reflective and transmissive optical component 104 receives and reflects a display image 128 from the display 102 and receives and transmits a scene image 132.

Referring again to FIG. 1A, the unitary reflective and transmissive optical component 104 includes a reflective surface 116 to reflect an image and a transmissive surface 118 to transmit a scene image. In some embodiments, the unitary reflective and transmissive optical component 104 includes a multi-layer interference stack reflective polarizer. A multi-layer interference stack reflective polarizer is an optical polarizer based on interference effects in a multilayer dielectric coating. The coating is usually placed on a glass plate but can also be manufactured on optical polymer carrier film. A birefringent optical material substrate is not required. The polarization-dependent reflectivity is achieved for a range of angles of incidence based on the refractive index and thickness design of each layer in the stack of coatings.

Referring to FIG. 1C, in some embodiments, the unitary reflective and transmissive optical component 104 includes a wire grid polarizer 120, as shown in FIG. 1C. The wire grid polarizer 120 includes an array of closely spaced thin metal wires formed on a transparent substrate 121. The wire grid is usually placed on a glass plate but can also be manufactured on optical polymer carrier film. A birefringent optical material substrate is not required. The polarization-dependent reflectivity is achieved for a range of angles of incidence based on the wire thickness, wire spacing, and wire depth. The pattern of wires made by Nano-Imprint-Lithography (NIL) techniques. In some embodiments of the wire grid polarizer manufacturing, the wires are made by plasma etching a film of aluminum after patterning a resist that is deposited over the aluminum layer. In some embodiments of the wire grid polarizer manufacturing, the wires are made by depositing reflective metals on the 3-dimensional pattern produced by NIL techniques and may include post-deposition plasma etching to improve performance. The wire grid polarizer 120 functions as a reflective polarizer and passes light oscillating perpendicular to the wires while reflecting light parallel to the wires.

In some embodiments, the unitary reflective and transmissive optical component 104 includes a holographic reflective polarizer. The holographic reflective polarizer is a wire grid polarizer that includes sub-micron wire grid spacing made by holographic patterning techniques. The wire grid is usually placed on a glass plate but can also be manufactured on optical polymer carrier film. A birefringent optical material substrate is not required. The polarization-dependent reflectivity is achieved for a range of angles of incidence based on the wire thickness, wire spacing, and wire depth. Referring to FIG. 1D, in some embodiments, the unitary reflective and transmissive optical component 104 includes a liquid crystal display 126 joined to the wire grid polarizer 120, as shown in FIG. 1D. A liquid crystal display is an electronic display that includes segments of a liquid crystal. The opacity of the segments varies according to the voltage applied to the segments and the orientation of the input (conditioning) polarizer and output (analyzing) polarizer.

Referring again to FIG. 1A, the contact lens 106 includes a thin lens that can be placed on or in an eye. In some embodiments, the contact lens 106 includes a rigid lens formed from organic polymers, including acrylates. In other embodiments the contact lens 106 includes lenses that are soft and manufactured with water containing polymers including hydrogel materials, silicone hydrogel materials or near zero water containing polymers like polydimethylsiloxane. In some embodiments, the lens includes two optical paths separated by linear light polarization filters.

In operation, the display 102 provides the display image 128 to the unitary reflective and transmissive optical component 104. The unitary reflective and transmissive optical component 104 receives the display image 128 and forms a reflected display image 130 having a first polarization. The unitary reflective and transmissive optical component 104 also receives the scene image 132 and forms a transmitted scene image 134 having a second polarization and including one or more occluded pixels 110 (shown in FIG. 1B). The first polarization is substantially orthogonal to the second polarization. The contact lens 106 receives the reflected display image 130 and the transmitted scene image 134 and forms a combined image 136 onto the retina of the wearer's eye. In some embodiments, filters are aligned with incoming images to allow for optical path separation. Thus, the lens includes two optical powers in a single system.

Figure 2A:
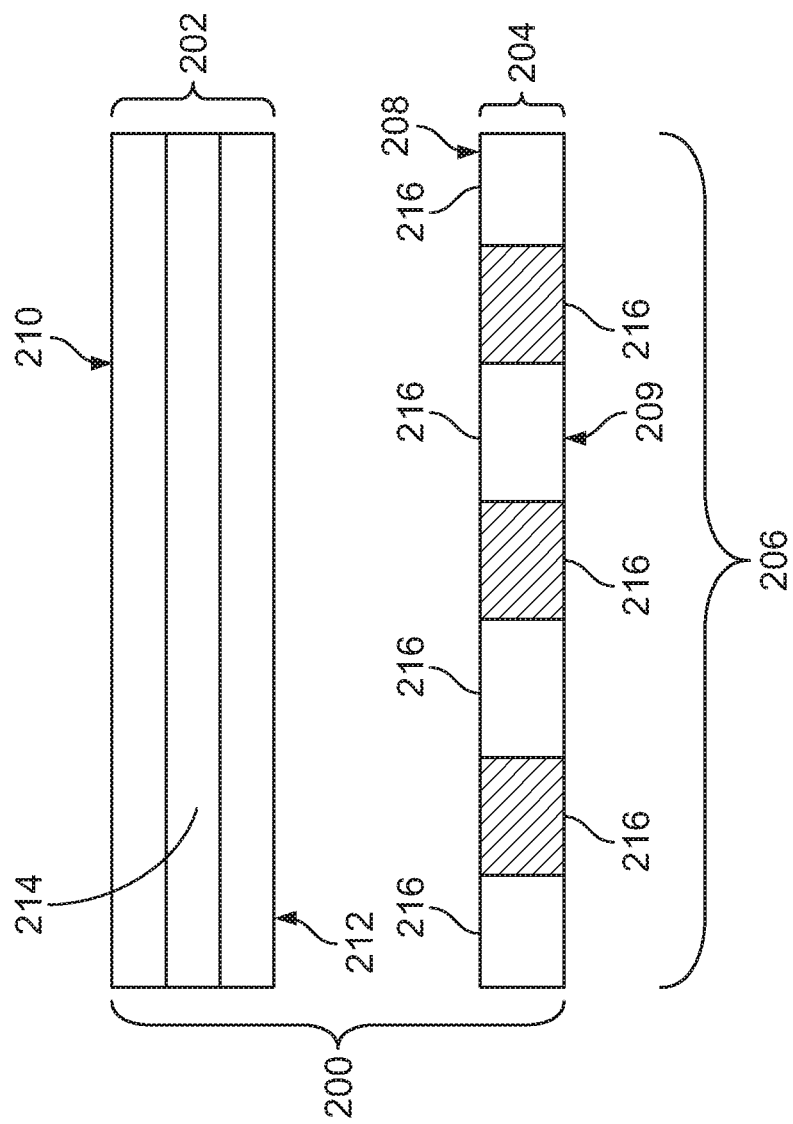
FIG. 2A shows an illustration of an apparatus for image processing in accordance with some embodiments of the present disclosure.

FIG. 2A shows an exploded side-view illustration of an apparatus 200 for image processing in accordance with some embodiments of the present disclosure. The apparatus 200 includes a substrate 202 and a pixelated display substrate 204 including a pixelated display 206 and having a pixelated display surface 208 and a light receiving surface 209. The substrate 202 has a first substrate surface 210 and a second substrate surface 212. A plurality of substantially parallel conductive and reflective lines 218 (shown in FIG. 2B) are formed on the first substrate surface 210 of the substrate 202. In some embodiments, the substrate 202 includes a spectral filter 214. A spectral filter blocks a range of frequencies of electromagnetic radiation. In some embodiments, the substrate 202 is joined to the pixelated display 206. The pixelated display 206 includes a plurality of pixels 216. Each of the plurality of pixels 216 has a transparent state and an occluded state. In some embodiments, the pixelated display surface 208 is joined to the second substrate surface 212.

Figure 2B:
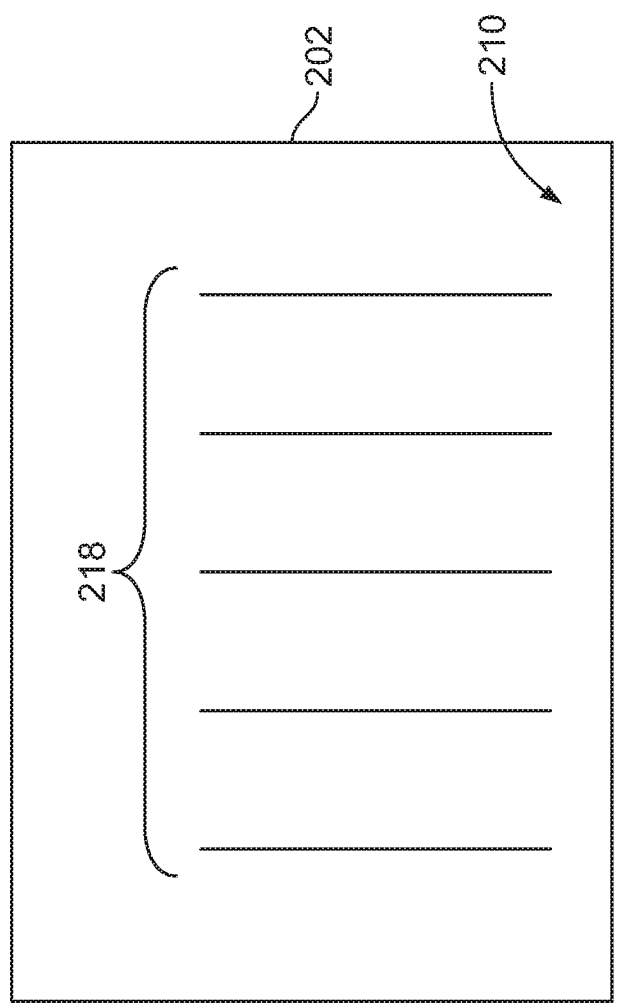
FIG. 2B shows an illustration of a plurality of substantially parallel conductive and reflective lines in accordance with some embodiments of the present disclosure.

FIG. 2B shows the substrate 202 including the plurality of substantially parallel conductive and reflective lines 218 formed on the first substrate surface 210.

Figure 2C:
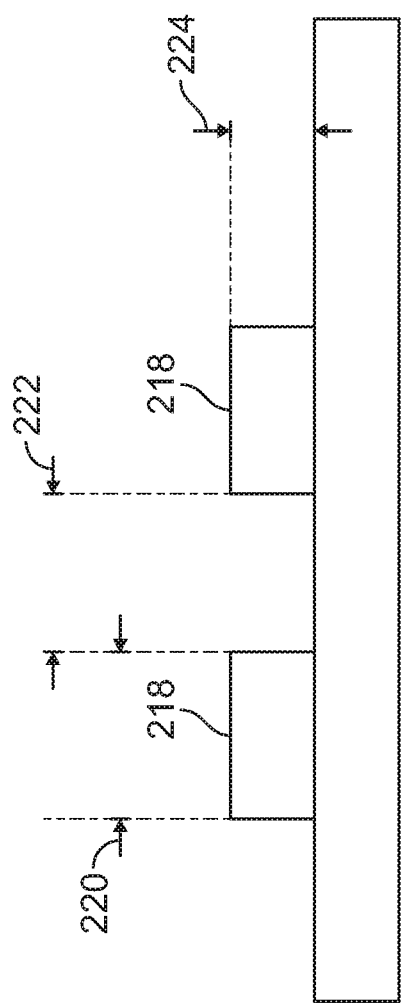
FIG. 2C shows an illustration of the pixelated display including a plurality of pixels in accordance with some embodiments of the present disclosure.

Referring to FIG. 2C, in some embodiments, each of the plurality of substantially parallel conductive and reflective lines 218 has a width 220 of about 75 nanometers, a spacing 222 of about 75 nanometers, and a height 224 of about 150 nanometers. In some embodiments, each of the plurality of substantially parallel conductive and reflective lines 218 includes aluminum.

In operation, referring again to FIG. 2A, each of the plurality of pixels 216 in the transparent state transmits substantially all received light at the light receiving surface 209 in a first polarization direction substantially orthogonal to the plurality of substantially parallel conductive and reflective lines 218. Each of the plurality of pixels 216 in the occluded state transmits light having a second polarization substantially parallel to the plurality of the substantially parallel conductive and reflective lines 218.

Figure 3:
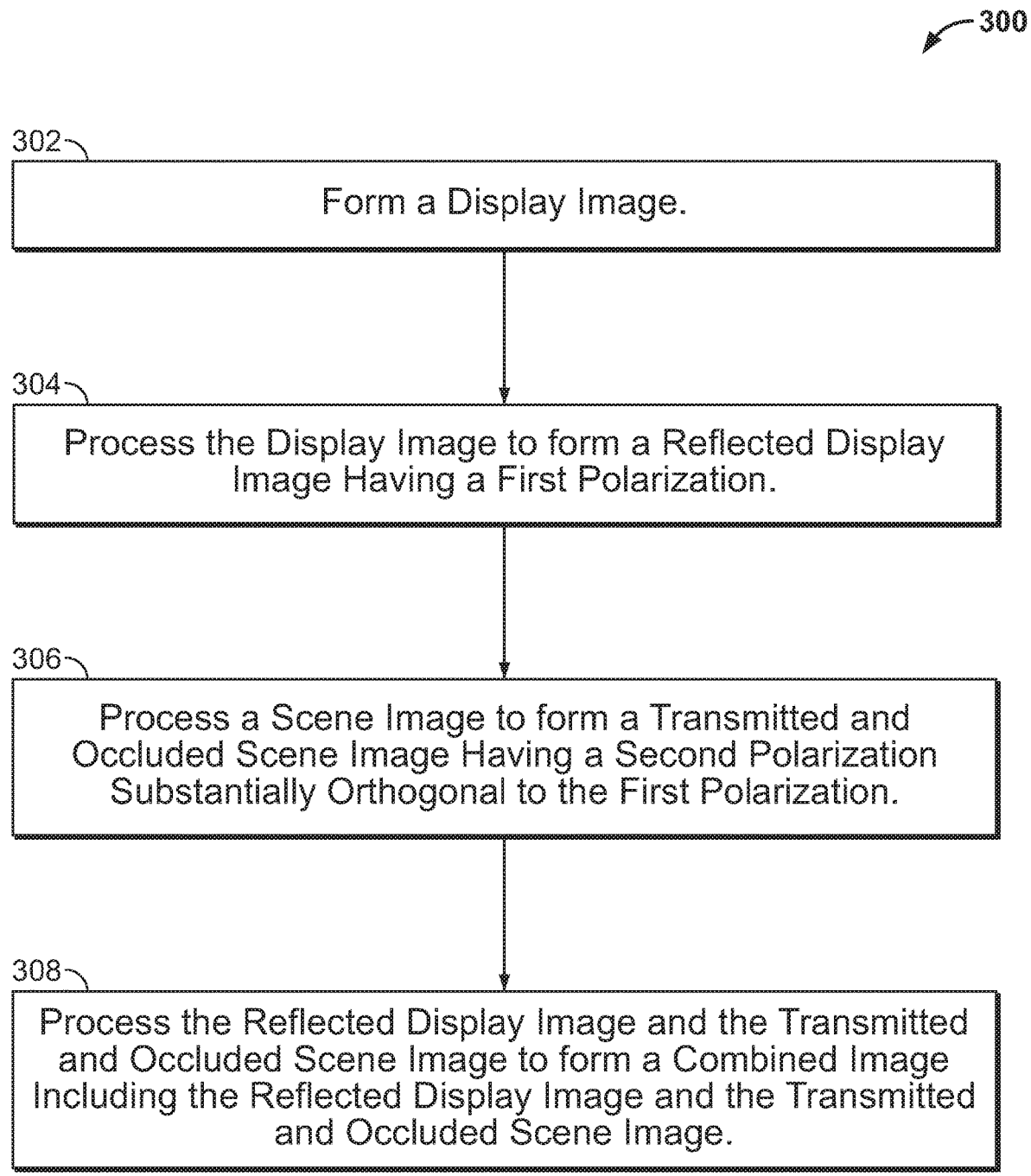
FIG. 3 shows a flow diagram of a method for forming an image in accordance with some embodiments of the present disclosure.

FIG. 3 shows an illustration of a flow diagram of a method 300 for forming an image in accordance with some embodiments of the present disclosure. The method 300 includes forming a display image (block 302), processing the display image to form a reflected display image having a first polarization (block 304), processing a scene image to form a transmitted and occluded scene image having a second polarization substantially orthogonal to the first polarization (block 306), and processing the reflected display image and the transmitted and occluded scene image to form a combined image including the reflected display image and the transmitted and occluded scene image (308). In some embodiments, processing the scene image to form the transmitted and occluded scene image including the second polarization substantially orthogonal to the first polarization includes activating one or more pixels in a pixelated display. In some embodiments, processing the reflected display image and the transmitted and occluded scene image to form the combined image including the reflected display image and the transmitted and occluded scene image includes optically processing the reflected display image and the transmitted and occluded scene image with a contact lens including a first filter to pass the first polarization and block the second polarization; and, a second filter to pass the second polarization and block the first polarization.

Figure 4:
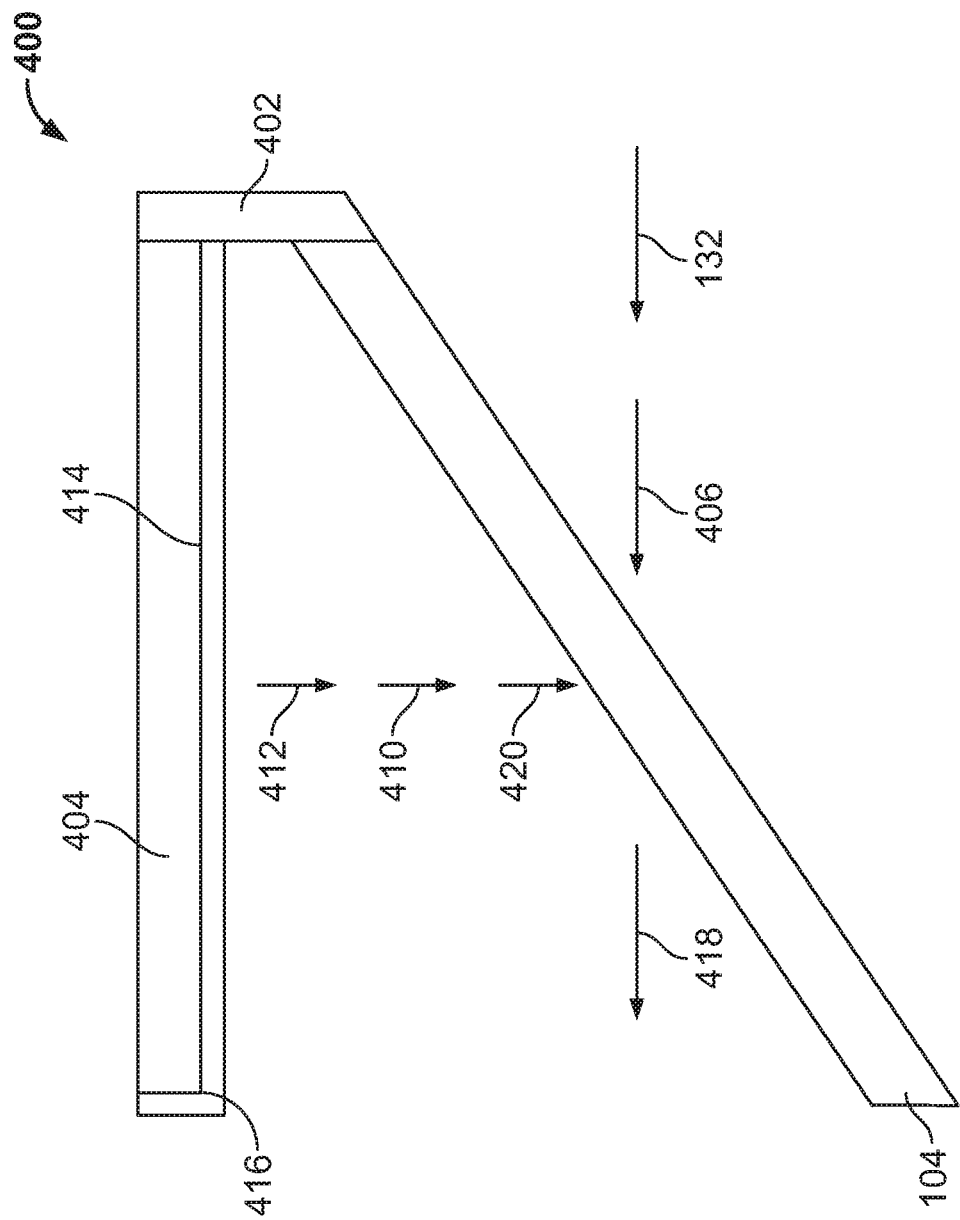
FIG. 4 shows an illustration of apparatus for processing an image in accordance with some embodiments of the present disclosure.

FIG. 4 shows an illustration of an apparatus 400 for processing an image in accordance with some embodiments of the present disclosure. The apparatus 400 includes an eyewear frame 402 including a spectacle lens, an emissive display 404 coupled to the eyewear frame 402, and a unitary reflective and transmissive optical component 104 coupled to the eyewear frame 402. The eyewear frame 402 provides a structure for mounting the emissive display 404 and the unitary reflective and transmissive optical component 104. The eyewear frame 402 surrounds a user's visual optical axis 406, and in operation, a central aspect of a scene image 132 travels along the user's visual optical axis 406.

The emissive display 404 is not limited to a particular display technology. Any display technology that emits its own light is an emissive display. An organic light-emitting diode display is one example of an emissive display suitable for use in connection with the apparatus 400. The emissive display 404 has a display optical axis 410 that intersects the user's visual optical axis 406, and in operation, the emissive display 404 generates an emissive display image 412. In some embodiments, the emissive display 404 is located between about five millimeters and about twenty millimeters from the unitary reflective and transmissive optical component 104. In some embodiments, the emissive display 404 is coupled to the eyewear frame 402 by fitting into a cavity 414 of a structure 416 coupled to the eyewear frame 402.

In some embodiments, the emissive display 404 emits a unique color having a unique wavelength, and the unitary reflective and transmissive optical component 104 includes a spectral filter 214 (shown in FIG. 2A) including an absorptive notch filter having a center wavelength substantially equal to the unique wavelength. In some embodiments, the absorptive notch filter has a width of between about five and about thirty nanometers. In some embodiments, the center wavelength is within about five and about twenty nanometers of the unique wavelength.

The unitary reflective and transmissive optical component 104 has a complementary visual optical axis 418 and a complementary display optical axis 420. The complementary visual optical axis 418 is substantially aligned with the user's visual optical axis 406 and the complementary display optical axis 420 is substantially aligned with the display optical axis 410. In some embodiments, the display optical axis 410 is tilted away from a user's eye to form an angle of between about seventy-five and about eighty-five degrees with respect to the user's visual optical axis 406. The unitary reflective and transmissive optical component 104, in operation, reflects and polarizes the emissive display image 412. The unitary reflective and transmissive optical component 104, in operation, also transmits and polarizes the scene image 132.

Reference throughout this specification to "an embodiment," "some embodiments," or "one embodiment." means that a particular feature, structure, material, or characteristic described in connection with the embodiment is included in at least one embodiment of the present disclosure. Thus, the appearances of the phrases such as "in some embodiments," "in one embodiment," or "in an embodiment," in various places throughout this specification are not necessarily referring to the same embodiment of the present disclosure. Furthermore, the particular features, structures, materials, or characteristics may be combined in any suitable manner in one or more embodiments.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An apparatus comprising:
    an eyewear frame, a spectacle lens in the eyewear frame, the spectacle lens having a scene image optical axis when worn by a user that is aligned with a user's visual optical axis, a scene image to be received substantially along the scene image optical axis;
    an emissive display coupled to the eyewear frame, the emissive display having a display optical axis to intersect the user's visual optical axis, the emissive display to form an emissive display image; and
    a unitary reflective and transmissive optical component coupled to the eyewear frame, the unitary reflective and transmissive optical component having a complementary transmitted optical axis and a complementary reflected optical axis, the complementary transmitted optical axis substantially aligned with the user's visual optical axis and the complementary reflected optical axis substantially aligned with the display optical axis, the unitary reflective and transmissive optical component to reflect and polarize the emissive display image along the user's visual optical axis, and the unitary reflective and transmissive optical component to transmit and polarize the scene image along the visual optical axis, the emissive display to emit a unique color having a unique wavelength, and the unitary reflective and transmissive optical component to include a spectral filter including an absorptive notch filter having a center wavelength substantially equal to the unique wavelength.

2. The apparatus of claim 1, wherein the absorptive notch filter has a width of between about five and about thirty nanometers.

3. The apparatus of claim 1, wherein the center wavelength is within about five and about twenty nanometers of the unique wavelength.

* * * * *